(12) United States Patent
Ahmed et al.

(10) Patent No.: US 10,216,681 B2
(45) Date of Patent: Feb. 26, 2019

(54) SYSTEM AND METHOD FOR MANAGING WORKLOADS AND HOT-SWAPPING A CO-PROCESSOR OF AN INFORMATION HANDLING SYSTEM

(71) Applicant: Dell Products, LP, Round Rock, TX (US)

(72) Inventors: Sajjad Ahmed, Round Rock, TX (US); Jinsaku Masuyama, Cedar Park, TX (US); John R. Palmer, Georgetown, TX (US); Dinesh Kunnathur Ragupathi, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 156 days.

(21) Appl. No.: 14/955,977

(22) Filed: Dec. 1, 2015

(65) Prior Publication Data

US 2017/0154005 A1    Jun. 1, 2017

(51) Int. Cl.
| | |
|---|---|
| *H05K 7/10* | (2006.01) |
| *G06F 13/40* | (2006.01) |
| *G06F 13/36* | (2006.01) |
| *G06F 9/4401* | (2018.01) |
| *H04L 12/24* | (2006.01) |

(52) U.S. Cl.
CPC ........ *G06F 13/4081* (2013.01); *G06F 13/36* (2013.01); *G06F 9/4411* (2013.01); *H04L 41/0213* (2013.01)

(58) Field of Classification Search
None
See application file for complete search history.

(56) References Cited

U.S. PATENT DOCUMENTS

| | | |
|---|---|---|
| 5,335,985 A | 8/1994 | Baur |
| 5,434,775 A | 7/1995 | Sims et al. |
| 5,505,533 A | 4/1996 | Kammersqard et al. |
| 5,774,668 A | 6/1998 | Choquier et al. |
| 5,805,442 A | 9/1998 | Crater et al. |
| 5,869,820 A | 2/1999 | Chen et al. |
| 5,910,776 A | 6/1999 | Black |
| 5,913,034 A | 6/1999 | Malcolm |
| 5,926,463 A | 7/1999 | Ahearn et al. |
| 5,956,665 A | 9/1999 | Martinez et al. |
| 5,956,723 A | 9/1999 | Zhu |
| 5,959,012 A | 9/1999 | Simonian et al. |
| 6,057,981 A | 5/2000 | Fish et al. |
| 6,112,246 A | 8/2000 | Horbal et al. |

(Continued)

*Primary Examiner* — Henry Tsai
*Assistant Examiner* — Aurangzeb Hassan
(74) *Attorney, Agent, or Firm* — Larson Newman, LLP

(57) ABSTRACT

An information handling system includes a host processing complex and a wireless management system. The host processing complex instantiates a hosted processing environment and includes a first general-purpose processing unit (GPU) and a GPU hot-plug module that enables a hot-plug operation to replace the first GPU with a second GPU while power is provided to the host processing complex. The hosted processing environment instantiates a first workload on the first GPU. The wireless management system operates out of band from the hosted processing environment, directs the hosted processing environment to halt the first workload, and directs the GPU hot-plug module to perform the hot-plug operation.

14 Claims, 11 Drawing Sheets

(56) References Cited

U.S. PATENT DOCUMENTS

| | | | |
|---|---|---|---|
| 6,131,119 A | 10/2000 | Fukui | |
| 6,167,448 A | 12/2000 | Hemphill et al. | |
| 6,282,175 B1 | 8/2001 | Steele et al. | |
| 6,601,084 B1 | 7/2003 | Bhaskaran et al. | |
| 6,654,347 B1 | 11/2003 | Wiedeman et al. | |
| 6,714,977 B1 | 3/2004 | Fowler et al. | |
| 6,826,714 B2 | 11/2004 | Coffey et al. | |
| 7,035,954 B1* | 4/2006 | Duran | G06F 13/4081 710/301 |
| 7,450,636 B2 | 11/2008 | Lee et al. | |
| 7,696,506 B2 | 4/2010 | Lung | |
| 7,720,987 B2 | 5/2010 | Penk et al. | |
| 8,031,763 B2 | 10/2011 | Sumesaglam | |
| 8,037,330 B2 | 10/2011 | Livescu et al. | |
| 8,588,288 B2 | 11/2013 | Witt | |
| 8,732,508 B2 | 5/2014 | Cochran et al. | |
| 9,087,161 B1* | 7/2015 | Diamond | G06F 13/4081 |
| 9,665,921 B2* | 5/2017 | Xia | G06T 1/20 |
| 9,786,256 B2* | 10/2017 | Zheng | G09G 5/393 |
| 2002/0095487 A1 | 7/2002 | Day et al. | |
| 2002/0141210 A1 | 10/2002 | Glannopoulos et al. | |
| 2003/0046339 A1 | 3/2003 | Ip | |
| 2004/0010649 A1 | 1/2004 | Weaver et al. | |
| 2004/0013188 A1 | 1/2004 | Tonietto et al. | |
| 2006/0182172 A1 | 8/2006 | Lin | |
| 2007/0094426 A1 | 4/2007 | Chiang et al. | |
| 2008/0304557 A1 | 12/2008 | Hollis | |
| 2008/0317021 A1 | 12/2008 | Ives et al. | |
| 2009/0189774 A1 | 7/2009 | Brundridge et al. | |
| 2009/0217073 A1 | 8/2009 | Brech et al. | |
| 2009/0307515 A1 | 12/2009 | Bandholz et al. | |
| 2010/0027687 A1 | 2/2010 | De Natale et al. | |
| 2010/0106154 A1 | 4/2010 | Harlev et al. | |
| 2011/0022245 A1 | 7/2011 | Goodrum et al. | |
| 2011/0179301 A1 | 7/2011 | Liu et al. | |
| 2012/0170638 A1 | 7/2012 | Chen | |
| 2012/0262956 A1 | 10/2012 | DeHaven | |
| 2012/0303767 A1 | 11/2012 | Renzin | |
| 2013/0007249 A1 | 1/2013 | Wang et al. | |
| 2013/0169314 A1 | 7/2013 | Choudhary et al. | |
| 2013/0300655 A1* | 11/2013 | Cameron | G06F 9/461 345/157 |
| 2014/0230067 A1* | 8/2014 | Sahita | G06T 1/60 726/26 |
| 2014/0269881 A1 | 9/2014 | He et al. | |
| 2014/0312953 A1 | 10/2014 | Song | |
| 2016/0071481 A1* | 3/2016 | Chakraborty | G06F 13/14 345/520 |

\* cited by examiner

SYSTEM AND METHOD FOR MANAGING WORKLOADS AND HOT-SWAPPING A CO-PROCESSOR OF AN INFORMATION HANDLING SYSTEM

FIELD OF THE DISCLOSURE

This disclosure generally relates to information handling systems, and more particularly relates to a system and method for Managing workloads and hot-swapping a co-processor of an information handling system in a data center.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
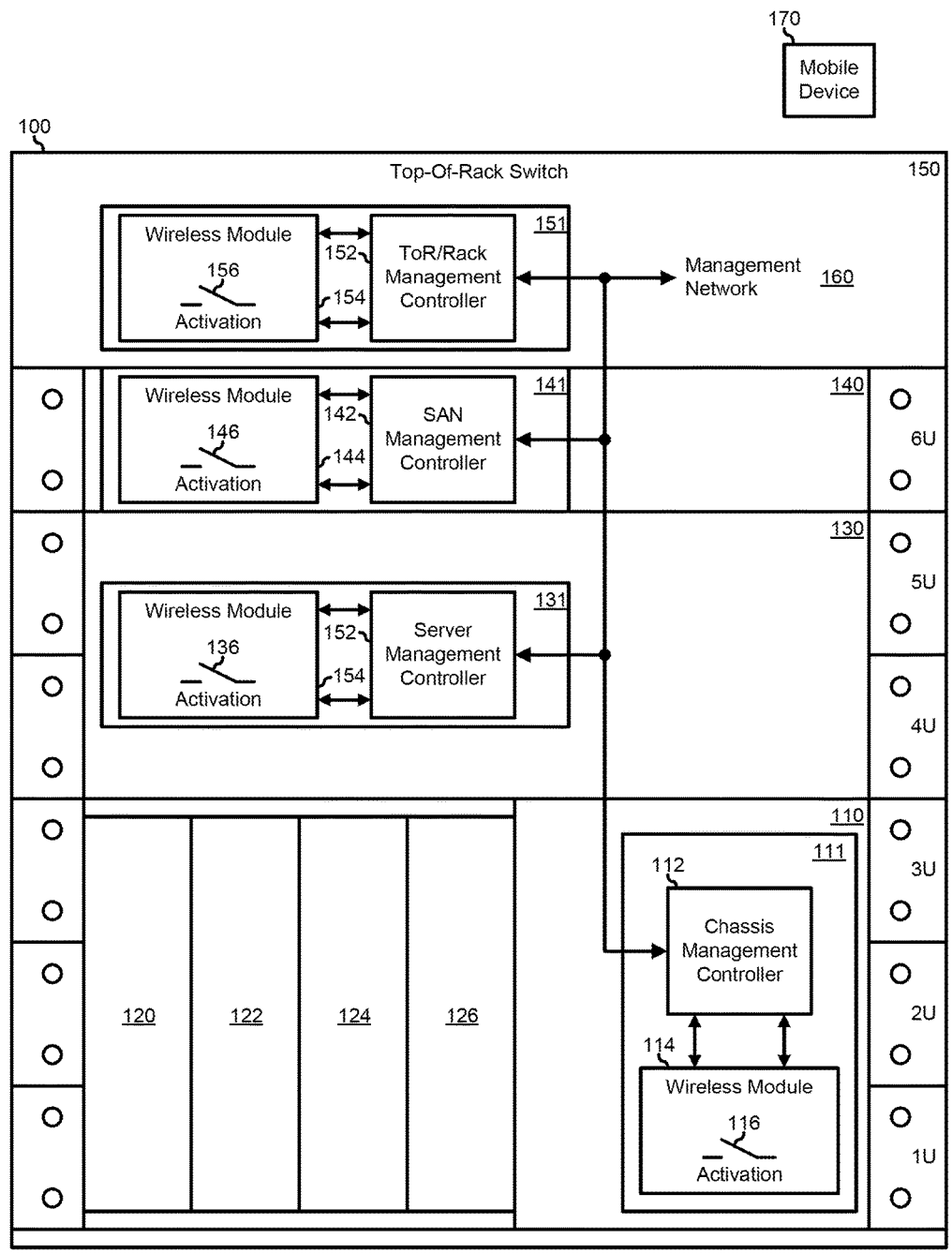
FIG. 1 is a view of a server rack according to an embodiment of the present disclosure.

FIG. 1 illustrates an embodiment of a server rack 100 including a blade chassis 110, a server 130, and a storage area network (SAN) 140 situated in a rack space of the server rack, and a top-of-rack (ToR) switch 150 at the top of the server rack. The rack space represents a standard server rack, such as a 19-inch rack equipment mounting frame or a 23-inch rack equipment mounting frame, and includes rack units, or divisions of the rack space that are a standardized unit of 1.75 inches high. For example, a piece of equipment that will fit an one of the rack units is referred to as a 1-U piece of equipment, another piece of equipment that takes up two of the rack units is referred to as a 2-U piece of equipment, and so forth. As such, the rack units are numbered sequentially from the bottom to the top as 1U, 2U, 3U, 4U, 5U, and 6U. The skilled artisan will recognize that other configurations for the rack units can be utilized as needed or desired. For example, a rack unit can be defined by the Electronic Components Industry Association standards council.

Blade chassis 110 represents a processing system of server rack 100 that is configured as a number of modular processing resources, or blades, that are provided in a common frame (i.e., the chassis). As such, blade chassis 110 includes server blades 120, 122, 124, and 126. Server 130 represents another processing system of server rack 100 that is configured as an individual processing resource. SAN 140 represents a data storage capacity of server rack 100 that provides a number of disk drives that are configured to the use of blade chassis 110 and of server 130, and can include other type of storage resource for server rack 100.

ToR switch 110 represents a network system of server rack 100, providing for high speed communications between blade chassis 110, server 130, SAN 140, and a network (not illustrated). In particular, ToR switch 150 is connected to blade chassis 110, server 130, and SAN 140 via a network fabric (not illustrated), to provide data routing between the elements.

Each element of server rack 100 includes a management system having a management controller and a wireless management module. As such, blade chassis 110 includes a chassis management system 111 with a chassis management controller 112 and a wireless management module 114, server 130 includes a server management system 131 with a server management controller 132 and a wireless management module 134, SAN 140 includes a SAN management system 111 with a SAN management controller 142 and a wireless management module 144, and ToR switch 150 includes a ToR management system 151 that includes a ToR management controller 152 and a wireless management module 154. Each of wireless management modules 114, 134, 144, and 154 include a respective activation switch 116, 136, 146, and 156, and respective indicators 118, 138, 148, and 158, described further, below.

Management systems 111, 131, 141, and 151 are connected together via a management network 160 to provide for out-of-band monitoring, management, and control of the respective elements of server rack 100. For example, management systems 111, 131, 141, and 151 can provide system monitoring functions, such as temperature monitoring, power supply monitoring, physical intrusion monitoring, hot-swap and hot-plug monitoring, other monitoring functions that can be performed outside of a hosted environment of the respective elements of server rack 100, or other system monitoring functions as needed or desired. Management systems 111, 131, 141, and 151 can also provide system management and control functions for the respective elements of server rack 100, such as cooling fan speed control, power supply management, hot-swap and hot-plug management, firmware management and update management for system BIOS or UEFI, Option ROM, device firmware, and the like, or other system management and control functions as needed or desired. As such, management controllers 112, 132, 142, and 152 represent embedded controllers associated with the respective elements of server rack 100 that operate separately from a hosted processing environment of the respective elements. For example, management controllers 112, 132, 142, and 152 can include a baseboard management controller (BMC), an Integrated Dell Remote Access Controller (IDRAC), or another type of management controller as needed or desired. Further, management controllers 112, 132, 142, and 152 can operate in accordance with an Intelligent Platform Management Interface (IPMI) specification, a Web Services Management (WSMAN) standard, or another interface standard for embedded management systems, as needed or desired. The skilled artisan will recognize that management controllers 112, 132, 142, and 152 can include other circuit elements, devices, or sub-systems, such as an embedded controller, a logic device such as a Programmable Array Logic (PAL) device, a Complex Programmable Logic Device (CPLD), a Field-Programmable Gate Array (FPGA) device, or the like, multiplexors, and other devices as needed or desired to provide the functions and features as described herein.

Wireless management modules 114, 134, 144, and 154 operate to provide wireless connectivity between a user with a wireless enabled mobile device 170 and management network 160 through the respective management controllers 112, 132, 142, and 152. For example, wireless management modules 114, 134, 144, and 154 can include WiFi wireless interfaces in accordance with one or more IEEE 802.11 specifications for high-speed data communication between mobile device 170 and the wireless management modules, at speeds of up to 30 mega-bits per second (MBPS) or more. Wireless management modules 114, 134, 144, and 154 can also include Bluetooth wireless interfaces in accordance with one or more Bluetooth specifications, including Bluetooth Low Energy (BLE), also known as Bluetooth Smart (BTS), for lower-speed communications at speeds of up to 150 kilo-bits per second (Kbps) or more.

Wireless management modules 114, 134, 144, and 154 include various security features to ensure that the connection between mobile device 170 and management network 160 is secure and that the user of the mobile device is authorized to access the resources of the management network. In particular, wireless management modules 114, 134, 144, and 154 operate to provide various WiFi user and device authentication schemes, such as schemes that are in accordance with one or more IEEE 802.11 specifications, Service Set Identification (SSID) hiding, Media Access Control Identification (MAC ID) filtering to allow only pre-approved devices or to disallow predetermined blacklisted devices, Static Internet Protocol (IP) addressing, Wired Equivalent Privacy (WEP) encryption, WiFi Protected Access (WPA) or WPA2 encryption, Temporary Key Integrity Protocol (TKIP) key mixing, Extensible Authentication Protocol (EAP) authentication services, EAP variants such as Lightweight-EAP (LEAP), Protected-EAP (PEAP), and other standard or vendor specific user and device authentication schemes, as needed or desired. Further, wireless management modules 114, 134, 144, and 154 operate to provide various Bluetooth device and service authentication schemes, such as a Security Mode 2 service level-enforced security mode that may be initiated after link establishment but before logical channel establishment, a Security Mode 3 link level-enforced security mode that may be initiated before a physical link is fully established, a Security Mode 4 service level-enforced security mode that may be initiated after link establishment but before logical channel establishment and that uses a Secure Simple Pairing (SSP) protocol, or other device or service authentication schemes, as needed or desired.

In a particular embodiment, wireless management modules 114, 134, 144, and 154 also provide additional security features that further assure the user, device, and service security of the connection between mobile device 170 and management network 160. In particular, wireless management modules 114, 134, 144, and 154 each include an activation switch 116, 136, 146, and 156, respectively, that operate to enable the establishment of the connection between the mobile device and the wireless management modules. In this way, the establishment of the connection between mobile device 170 and wireless management modules 114, 134, 144, and 154 is predicated on the physical proximity of a user and of the user's mobile device to server rack 100, and also upon an action indicating a request to establish the connection. Here, a remote device and user would not be able to initiate an attack on management network 160 because of the lack of physical proximity to server rack 100 to activate activation switches 116, 136, 146, or 156, and so any attempt to attack management network would have to wait at least until a service technician activated one of the activation switches. In another embodiment, one or more of wireless management modules 114, 134, 144, and 154 and mobile device 170 operate to detect a Received Signal Strength Indication (RSSI) or a Received Channel Power Indication (RCPI) to permit the determination of the proximity between the mobile device and the wireless management modules, as described further, below. In a particular embodiment, one or more of wireless management modules 114, 134, 144, and 154 does not include an activation switch, and the particular wireless management modules provide for the establishment of the connection between the mobile device the wireless management modules in response to another activation request from the mobile device.

The elements of server rack 100, blade chassis 110, server 130, storage 140, and ToR switch 150 are exemplary, and more or fewer elements can be considered to be included in the server rack as needed or desired, and that other types of elements can be included in the server rack as needed or desired. Further, the management network of server rack 100 can include management controllers associated with more or fewer elements or different types of elements, and needed or desired.

Figure 2:
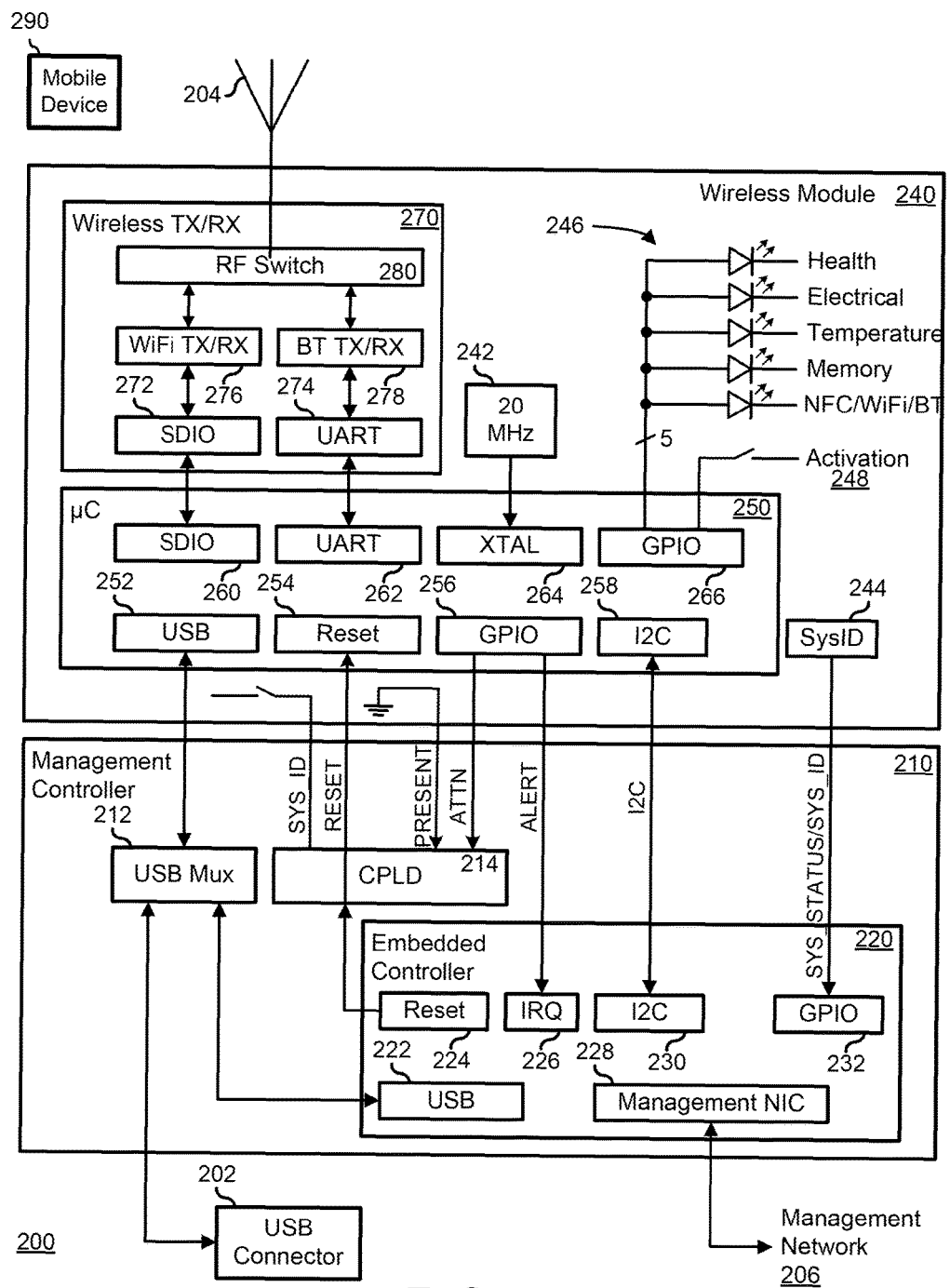
FIG. 2 is a block diagram illustrating a management system of the server rack of FIG. 1.

FIG. 2 illustrates a management system 200 similar to management systems 111, 131, 141, and 151, and includes a management controller 210 that is similar to management controllers 112, 132, 142, and 152, a wireless management module 240 similar to wireless management modules 114, 134, 144, and 154, a USB connector 202, a wireless device antenna 204, and a connection to a management network 206. Management controller 210 includes a USB multiplexor 212, a CPLD 214, and an embedded controller 220. Embedded controller 220 includes a USB interface 222, a reset function output 224, an interrupt request input 226, a management network interface device (NIC) 228, an Inter-Integrated Circuit (I2C) interface 230, and a General Purpose I/O (GPIO) 232.

Wireless management module 240 includes a 20 megahertz (MHz) crystal 242, a system ID module 244, indicators 246, an activation switch 248, a micro-controller 250, and a wireless transceiver module 270. Micro-controller 250 includes a USB interface 252, a reset function input 254, GPIOs 256 and 266, an I2C interface 258, a Secure Digital I/O (SDIO) interface 260, a Universal Asynchronous Receiver/Transmitter (UART) 262, and a crystal input 264. Wireless transceiver module 270 includes and SDIO interface 72, a UART 274, a WiFi transceiver 276, a Bluetooth transceiver 278, and a Radio Frequency (RF) switch 280. Management controller 210 and wireless management module 240 will be understood to include other elements, such as memory devices, power systems, and other elements as needed or desired to perform the operations as described herein. In a particular embodiment, wireless management module 240 is configured as a pluggable module that can be installed into management system 200, or not, as needed or desired by the user of a rack system that includes the management system. The skilled artisan will recognize that other configurations can be provided, including providing one or more element of management controller 210 or wireless management module 240 as a pluggable module, as elements on a main board of management system 200, or as integrated devices of the management system.

USB multiplexor 212 is connected to USB connector 202, and USB interfaces 222 and 252 to make a selected point-to-point USB connection. For example, a connection can be made between a USB device plugged in to USB connector 202 and embedded controller 220 by connecting the USB connector to USB interface 222. In this way, a device plugged in to USB connector 202 can access the management functions and features of the information handling system that is managed by management controller 210, and can access management network 206. Alternatively, a connection can be made between a USB device plugged in to USB connector 202 and micro-controller 250 by connecting the USB connector to USB interface 252. In this way, a device plugged in to USB connector 202 can access the management functions and features of wireless management module 240. For example, a technician in a data center can connect a laptop device to USB connector 202, configure USB multiplexor 212 to make a point-to-point connection to USB interface 252, and provide a firmware update for wireless management module 240. Finally, a connection can be made between embedded controller 220 and micro-controller 250 by connecting USB interface 222 to USB interface 222. In this way, a mobile device 290 that has established a wireless connection to wireless management module 240 can access the management functions and features of the information handling system that is managed by management system 200, the mobile device can access management network 206, and the management network can be used to access the management functions and features of the wireless management module or to provide a firmware update for the wireless management module. USB connector 202, USB multiplexor 212, and USB interfaces 222 and 252 can be configured in accordance with the USB Standard Revision 3.1, or with another USB Standard Revision, as needed or desired. In updating the firmware of wireless management module 240, micro-controller 250 operates to provide version retrieval, fail-safe updating, signature validation, and other operations needed or desired to perform the firmware update of the wireless management module. In a particular embodiment, management controller 210 does not include USB multiplexor 212, and USB interfaces 222 and 252 are directly connected together.

CPLD 214 represents a logic device for implementing custom logic circuitry to interface between various off-the-shelf integrated circuits, and particularly between embedded controller 220 and micro-controller 250. In particular, CPLD 214 operates to receive a system identification input (SYS_ID) from wireless management module 240, to receive the reset signal from reset function output 224, to forward the reset signal to reset function input 254, to receive a module present (PRESENT) signal from the wireless management module, and to receive an interrupt (INT) signal from GPIO 256. The SYS_ID can be provided based upon one or more settings, such as jumper settings, fusible links, register settings, or other settings, as needed or desired. In another embodiment, one or more functions of CPLD 214 is provided by embedded controller 220, or by micro-controller 250, as needed or desired.

Embedded controller 220 represents an integrated device or devices that is utilized to provide out-of-band management functions to the information handling system that includes management system 200, and can include a BMC, an IDRAC, or another device that operates according to the IPMI specification. In particular, embedded controller 220 operates to receive an interrupt alert (ALERT) signal from GPIO 258 on interrupt request input 230, to send and receive information between I2C 230 and I2C 258, and to receive system status information and system identification information (SYS_STATUS/SYS_ID) from system ID module 244.

Micro-controller 250 represents an embedded controller that operates to control the functions and features of wireless module 240, as described further, below. Micro-controller 250 operates to send and receive information between SDIO interface 260 and SDIO interface 272, to send and receive information between UART 262 and UART 274, to receive a crystal clock signal input from crystal 242, to provide control outputs from GPIO 266 to indicators 246, and to receive an activation input from activation switch 248 at GPIO 266. Indicators 246 provide visual indications of various statuses for wireless management module 240, including a health indication, a electrical/power indication, a temperature indication, a memory status indication, and a radio status indication that identifies the type of a mobile device that is connected to wireless management module, such as a WiFi device, a Bluetooth device, or a Near Field Communication (NFC) device. In a particular embodiment, micro-controller 250 provides other modes of communication between management controller 210 and wireless transceiver module 270, as needed or desired.

Wireless transceiver module 270 represents a mixed-signal integrated circuit device that operates to provide the radio signal interface to a mobile device 290 and to provide data interfaces to micro-controller 250. As such, wireless transceiver module 270 includes a WiFi channel that includes SDIO interface 272 and WiFi transceiver 276, and a Bluetooth channel that includes UART 274 and Bluetooth transceiver 278 that each are connected to RF switch 280. RF switch 280 switches antenna 204 to selectively provide WiFi communications or Bluetooth communications to mobile device 290. In a particular embodiment, wireless transceiver module 270 represents an off-the-shelf device to provide WiFi and Bluetooth wireless communications with mobile device 290.

Management controller 210 operates to provide management and configuration of wireless management module 240, such as by providing firmware updates, SSID configuration, WEP or WPA2 passwords, and the like. In interfacing with management controller 210, wireless management module 240 is represented as a composite USB device, and is connected as two different devices to the management controller. In operating with a WiFi connected mobile device, such as mobile device 290, management controller 210 instantiates a USB class NIC device driver, and the management controller treats the wireless management module in accordance with an Ethernet Remote Network Driver Interface Specification (RNDIS), a USB Communication Device Class (CDC) device, a USB NIC, or another USB network class device. Thus, as viewed from management controller 210, wireless management module 240 operate as a USB NIC, and as viewed from mobile device 290 the wireless management module operates as a WiFi class device, as described further below.

In operating with a Bluetooth connected mobile device, such as mobile device 290, management controller 210 acts as a Bluetooth Host Controller, using a Host Controller Interface (HCI) protocol to communicate with wireless management module 240 via a serial port (UART). In another embodiment, wireless management module 240 is viewed by management controller 210 as a Bluetooth dongle. Thus, as viewed from management controller 210, wireless management module 240 operate as a USB CDC, and as viewed from mobile device 290 the wireless management module operates as a Bluetooth device, as described further below.

Wireless management module 240 operates to deactivate one or more of the WiFi stack and the Bluetooth stack in response to a timeout event. As such, micro-controller 250 can include a timer that determines if a connected device has gone dormant or otherwise ceased to interact with management system 200, such as when mobile device 290 has moved out of range of wireless management module 240. Here, wireless management module 240 can suspend the connected session with the mobile device, and no new session will be initiated until activation switch 248 is activated to indicate that a new session is requested. For example, when a user who is connected using mobile device 290 with management system 200, but subsequently walks away from a server rack that includes the management system, wireless management module 240 can automatically detect the time that the connection is idle, and, after a predetermined duration, can shut down the connection and suspend all wireless activity until a new session is requested. Further, wireless management module 240 operates such that a selected one or both of the WiFi stack and the Bluetooth stack can be disabled. In a particular embodiment, wireless management module 240 operates to configure the transmission power level of the WiFi channel and of the Bluetooth channel.

Mobile device 290 represents a wireless communication enabled device, such as a tablet device, a laptop computer, a smart phone, and the like, that is configured to interact with management system 200 via a wireless connection to wireless management module 240. In particular, mobile device 290 can include a mobile operating system (OS), such as an Android OS, an iOS, a Windows mobile OS, or another mobile OS that is configured to operate with the hardware of the mobile device. As such, the hardware of mobile device 290 can include Android-enabled hardware, iOS-enabled hardware, Windows-enabled hardware, or other hardware, as needed or desired.

Figure 3:
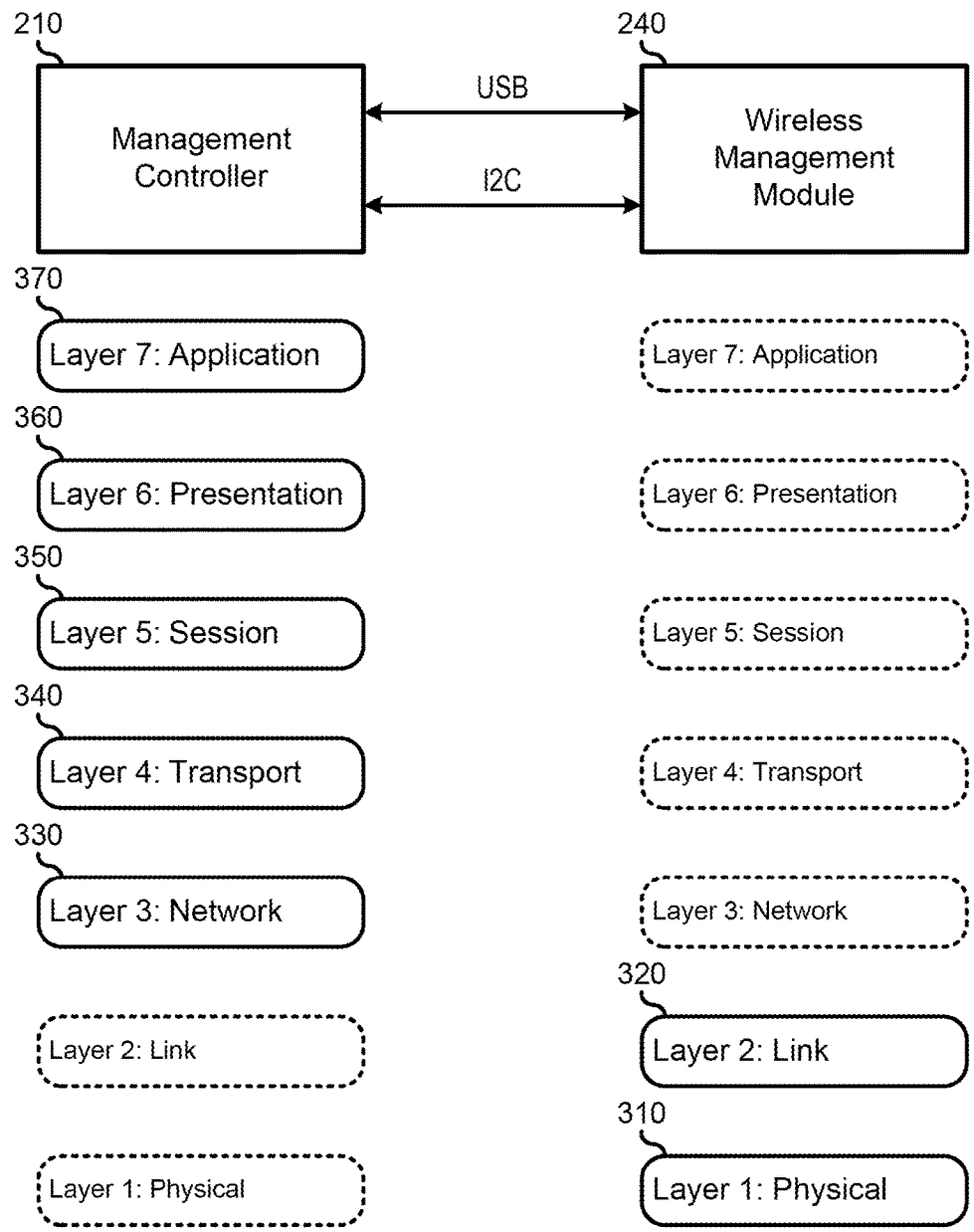
FIG. 3 is an illustration of an OSI layer arrangement of the management system of FIG. 2.

FIG. 3 illustrates management system 200, including the stack up of an Open Systems Interconnection (OSI) communication model layer arrangement for the management system. Here, the physical layer (L1) 310 and the link layer (L2) 320 are included in the functionality of wireless management module 240, and the network layer (L3) 330, the transport layer (L4) 340, the session layer (L5) 350, the presentation layer (L6) 360, and the application layer (L7) 370 are included in management controller 210.

Figure 4:
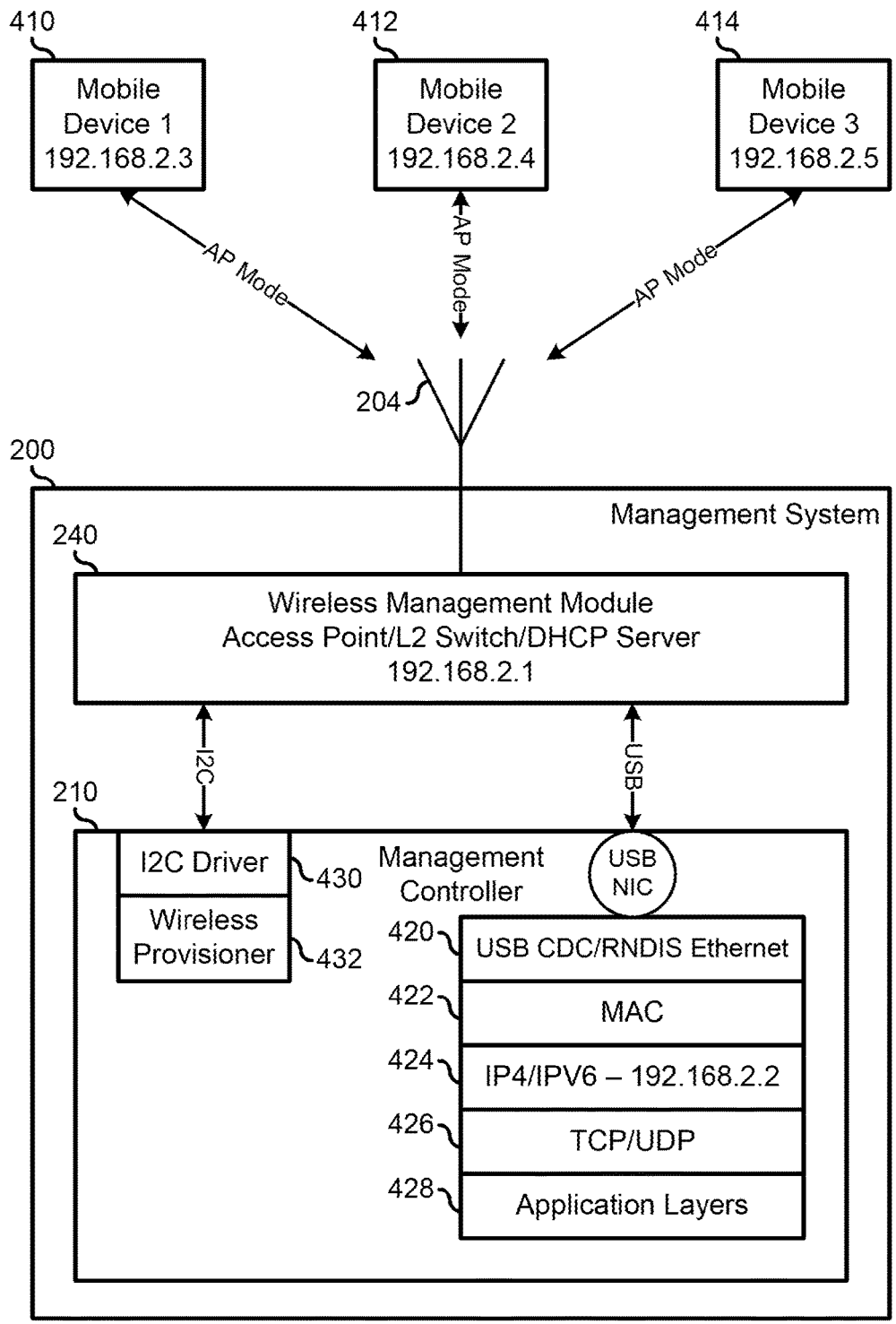
FIGS. 4 and 5 are block diagrams of various embodiments of wireless WiFi-based management networks on the management system of FIG. 2.

FIG. 4 illustrates an embodiment of a wireless WiFi-based management network 400 on management system 200. Here, wireless management module 240 presents itself to management controller 210 as a USB NIC functionality, and the management controller is illustrated as providing a USB NIC functionality by including a USB CDC/RNDIS Ethernet driver 420, a MAC address 422, an IP address 424 (192.168.2.2), a Transmission Control Protocol (TCP) and User Datagram Protocol (UDP) layer 426, and an application layer 428. Management controller 210 is also illustrated as providing an I2C interface including an I2C driver 430 and a wireless provisioner 432. Note that the IP address can be an IP version 4 (IP4) address, as illustrated, or an IP version 6 (IPV6) address, as needed or desired. Wireless management module 240 operates independently from management controller 210 in establishing and maintaining WiFi-based management network 400.

In establishing WiFi-based management network 400, wireless management module 240 is configured as a wireless access point that allows multiple mobile devices to be connected to management system 200. As such, management system 200 is illustrated as being connected with mobile devices 410, 412, and 414. Wireless management module 240 provides WiFi security functionality to mobile devices 410, 412, and 414, such as by screening the WIFI SSID so that only mobile devices that are aware of the existence of the wireless management module can be provide a request to be connected, by providing a key secured establishment of the connection, by encrypting communications between the mobile devices and the wireless management module using WEP, WPA, WPA2, or another encryption protocol, by providing other security assurance functions and features, or a combination thereof.

In addition, wireless management module 240 operates as a Dynamic Host Configuration Protocol (DHCP) host that provides a unique IP address to connected mobile devices 410, 412, and 414, the wireless management module can establish the connections with the mobile devices based upon static IP addresses of the mobile devices, or the wireless management module can provide a sub-network using a combination of DHCP-provided IP addresses and static IP addresses, as needed or desired. Further, wireless management module 240 views management controller 210 as a separate IP endpoint and can provide the management controller with a DHCP-provided IP address or the management controller can include a static IP address as needed or desired. In another embodiment, management controller 210 operates as a DHCP host that provides IP addresses to connected mobile devices 410, 412, and 414. In a particular embodiment, the DHCP host operates in accordance with the DHCPv6 specification, in a stateless auto-configuration mode, or another IP protocol.

Further, wireless management module 240 operates as a Layer-2 switch that redirects packets on the sub-network to the targeted endpoints. As such, mobile devices 410, 412, and 414, wireless management module 240, and management controller 210 can communicate with each other on the sub-network provided by the wireless management module. Also, wireless management module 240 operates to distribute gateway information to mobile devices 410, 412, and 414, and to management controller 210. Further, wireless management module 240 supports blacklisting and whitelisting of specific IP addresses that request access to management system 200.

In a particular embodiment, management controller 210 operates to provide various configuration information to wireless management module 240 via WiFi provisioner 432. As such, management controller 210 can provide SSIDs, security keys, gateway addresses, and other configuration information, to wireless management module 240 via one of USB interfaces 222 and 252, and I2C interfaces 230 and 258. Here, because USB interfaces 222 and 252 and I2C interfaces 230 and 258 are within a server rack, and thus are deemed to be secure, wireless management module 240 does not need to employ additional security measures in accepting such configuration information from management controller 210. In another embodiment, wireless management module 240 receives the various configuration information from one or more of mobile devices 410, 412, and 414. Here, because a connection between wireless management module 240 and mobile devices 410, 412, and 414 is less secure than the connection to management controller 210, the wireless management module includes a management mode that is accessed via additional security and authentication functions and features in order to ensure that the users of the mobile devices are authorized to make such configuration modifications. For example, the management mode can be accessed via an additional username and password verification, via a hardware device authentication, or another mechanism for providing security and authentication, as needed or desired. In another embodiment, communications between management controller 210 and wireless management module 250 is conducted by other communication interfaces than USB interfaces 222 and 252, and I2C interfaces 230 and 258, as needed or desired.

A method of providing WiFi-based management network 400 on management system 200 includes powering on the management system, and determining that wireless management module 240 is installed into the management system. If wireless management system 240 is installed, then management controller 210 issues a DHCP request to connect to the access point that is established on the wireless management module. Wireless management module 240 assigns an IP address (192.168.2.2) to management controller 210 that is in the same sub-network as the access point (192.168.2.1). Next, mobile device 410 issues a DHCP request to connect to the access point and wireless management module 240 assigns an IP address (192.168.2.3) to the mobile device. Similarly, mobile devices 412 and 414 issue DHCP requests to connect to the access point and wireless management module 240 assigns IP addresses (192.168.2.4 and 192.168.2.5) to the mobile devices. In this way, management controller 210, wireless management module 240, and mobile devices 410, 412, and 414 can communicate over the sub-network with each other.

Figure 5:
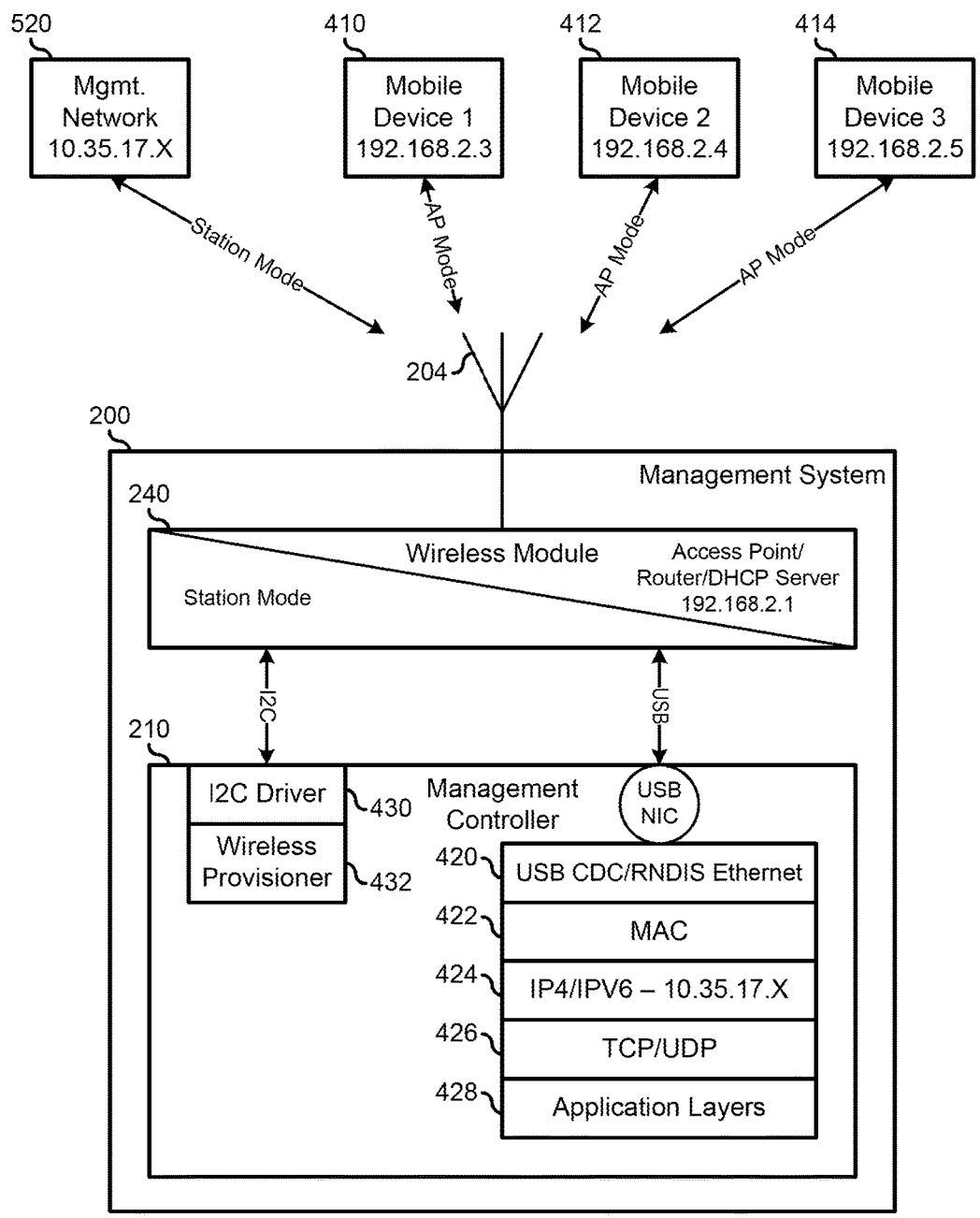

FIG. 5 illustrates another embodiment of a wireless-based management network 500 on management system 200. WiFi based management network 500 includes the functions and features of WiFi based management network 400, where wireless management module 240 operates in an access point mode to form a sub-network with mobile devices 410, 412, and 414. In addition to establishing WiFi-based management network 400, wireless management module 240 is configured as a wireless base station that permits the wireless management module to connect to a wireless management network 520 on a different sub-network. In the wireless base station mode, wireless management module 240 operates as a wireless client to wireless management network 520, such that the wireless management module operates to provide a DHCP request and authentication credentials to the wireless management network, and is authenticated by the wireless management network. Here, wireless management module 240 operates as a router that permits mobile devices 410, 412, and 414, and management controller 210 to communicate with wireless management network 520. In another embodiment, management controller 210 operates as the router, as needed or desired.

In a particular embodiment, management controller 210 is established as a node on wireless management network 520. Here, in one case, management controller 210 can be initially connected to, and established as a node on management network 520 through wireless management module 240, and then the wireless management module can establish the access point sub-network with mobile devices 410, 412, and 414. In another case, wireless management module 240 can establish the access point sub-network with mobile devices 410, 412, and 414, and management controller 210, as described above. Then, management controller 210 can perform a USB disconnect and a USB reconnect to wireless management module 240, and can send a DHCP request and authentication credentials to wireless management network 520 to obtain an IP address that is on the sub-network of the wireless management network.

A method of providing WiFi-based management network 500 on management system 200 includes the method for providing WiFi-based management network 400, as described above. After management controller 210, wireless management module 240, and mobile devices 410, 412, and 414 are established on the first sub-network, the management controller directs the wireless management module 240 to operate in a concurrent access point and base station mode. Wireless management module 240 then disconnects from the USB interface and reconnects to the USB interface with management module 210, and the management module sends SSID and authentication information to the wireless management module. Wireless management module 240 then sends a DHCP request and the authentication information to wireless management network 520. Wireless management network 520 sends an IP address (10.35. 17.X) to management controller 210 and authenticates the management controller onto the new sub-network. Here, because wireless management module 240 operates as a router, mobile devices 410, 412, and 414 can also communicate with wireless management network 520.

Figure 6:
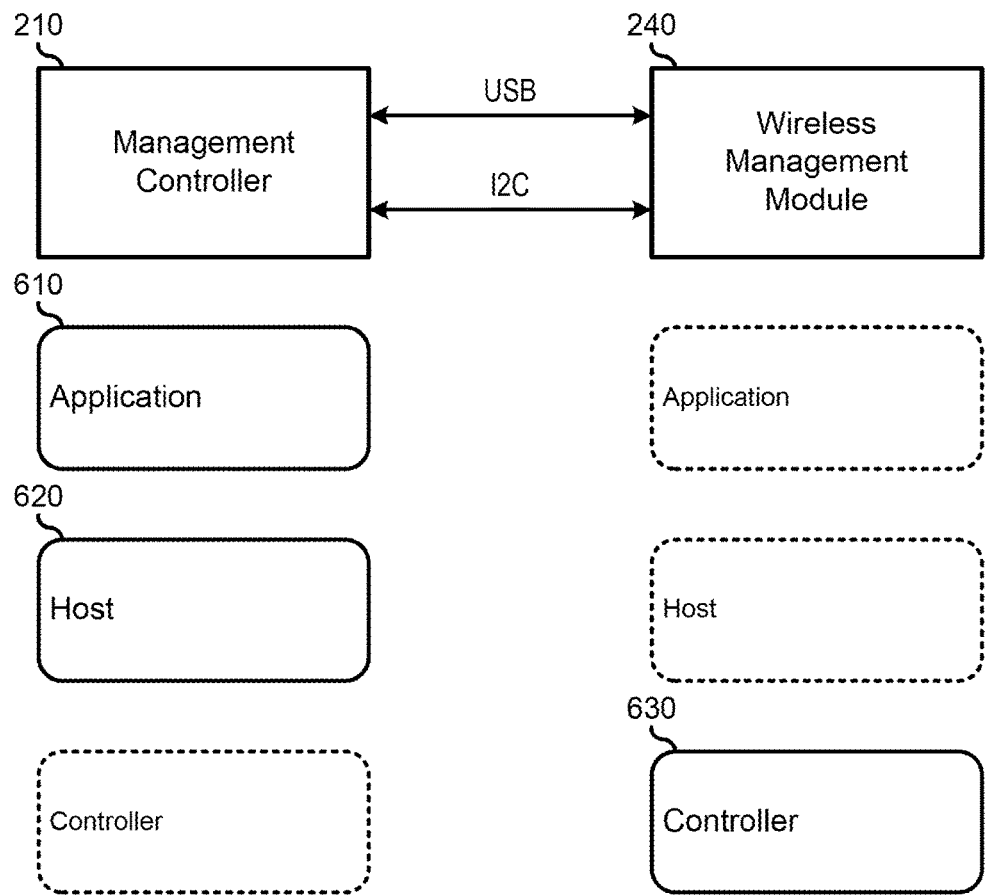
FIG. 6 is an illustration of a Bluetooth stack arrangement of the management system of FIG. 2.

FIG. 6 illustrates management system 200, including the stack up of a Bluetooth communication arrangement for the management system. Here, the application 610 and the host 620 are included in the functionality of management controller 210, and the controller 630 is included in the functionality of wireless management module 240.

Figure 7:
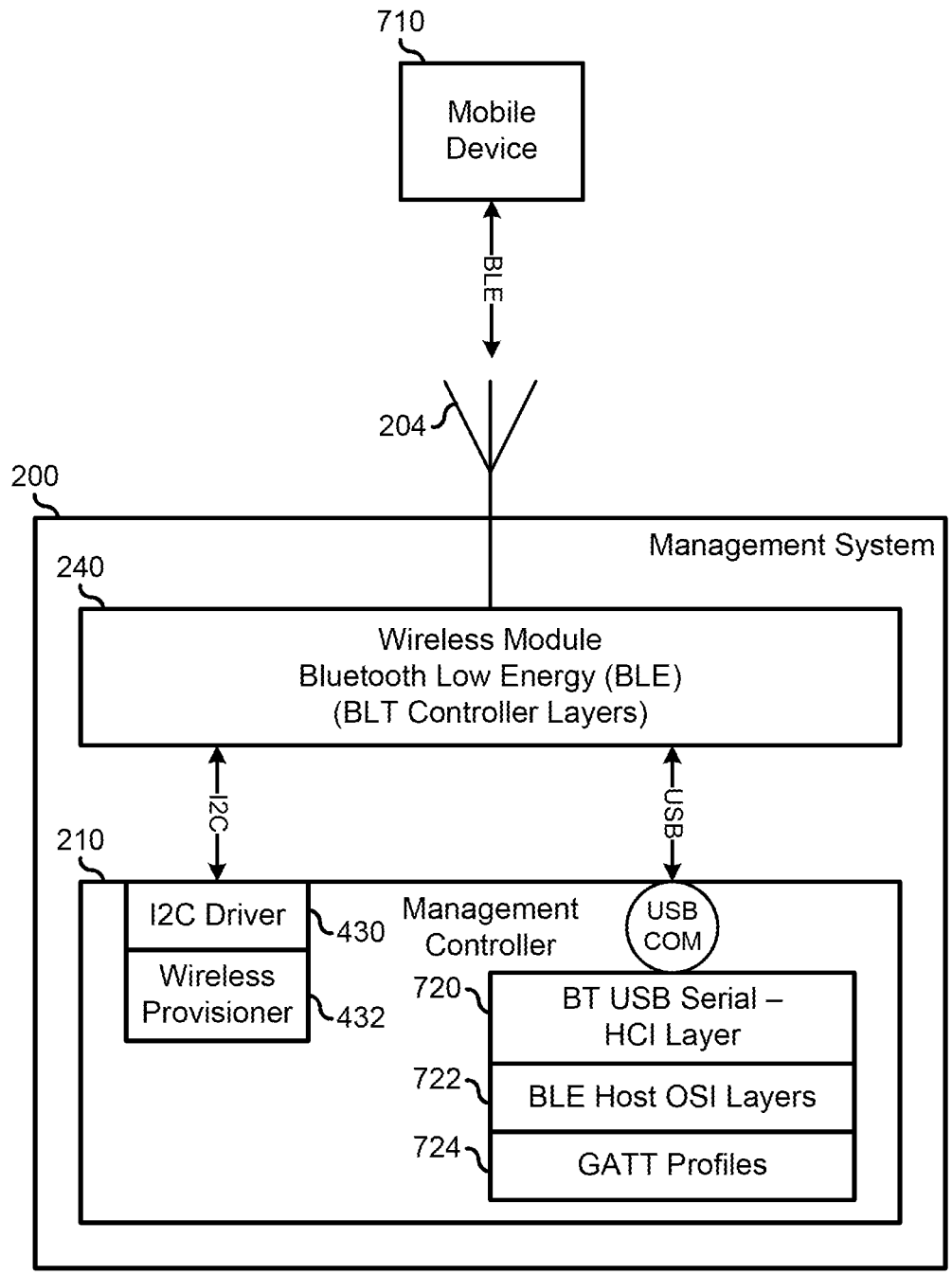
FIG. 7 is a block diagram of a wireless Bluetooth-based management network on the management system of FIG. 2.

FIG. 7 illustrates an embodiment of a wireless Bluetooth-based management network 700 on management system 200. Here, wireless management module 240 presents itself to management controller 210 as a USB COM port functionality, and the management controller is illustrated as including a Bluetooth USB—HCI layer 720, Bluetooth Low Energy (BLE) host OSI layers 722, and Bluetooth Generic Attribute Profiles (GATT) 724. Management controller 210 is also illustrated as providing I2C driver 430 and wireless provisioner 432, which tunes and controls the behavior of the wireless management module over the I2C bus. Wireless management module 240 operates independently from management controller 210 in establishing and maintaining Bluetooth-based management network 700.

In establishing Bluetooth-based management network 700, wireless management module 240 is configured as a Bluetooth controller in accordance with a Bluetooth Core Specification, and can connect a single mobile device 710 to management system 200. Management controller 210 operates to provide and maintain the BLE beacon data, content, and pass keys in wireless management module 240, and directs the wireless management module to change between operating modes, such as an advertising mode, a scanning mode, a master mode, a slave mode, or another operating mode, as needed or desired. In a particular embodiment, wireless management module 240 operates to configure the transmission power level of the Bluetooth channel, and supports RSSI and RCPI reporting on the incoming signal from mobile device 710. Further, wireless management module 240 supports blacklisting and whitelisting of specific mobile devices that request access to management system 200, such as by identifying a particular MAC address, IP address, International Mobile-station Equipment Identity (IMEI), Mobile Equipment Identifier (MEID), or other unique identifier for a mobile device.

Figure 10:
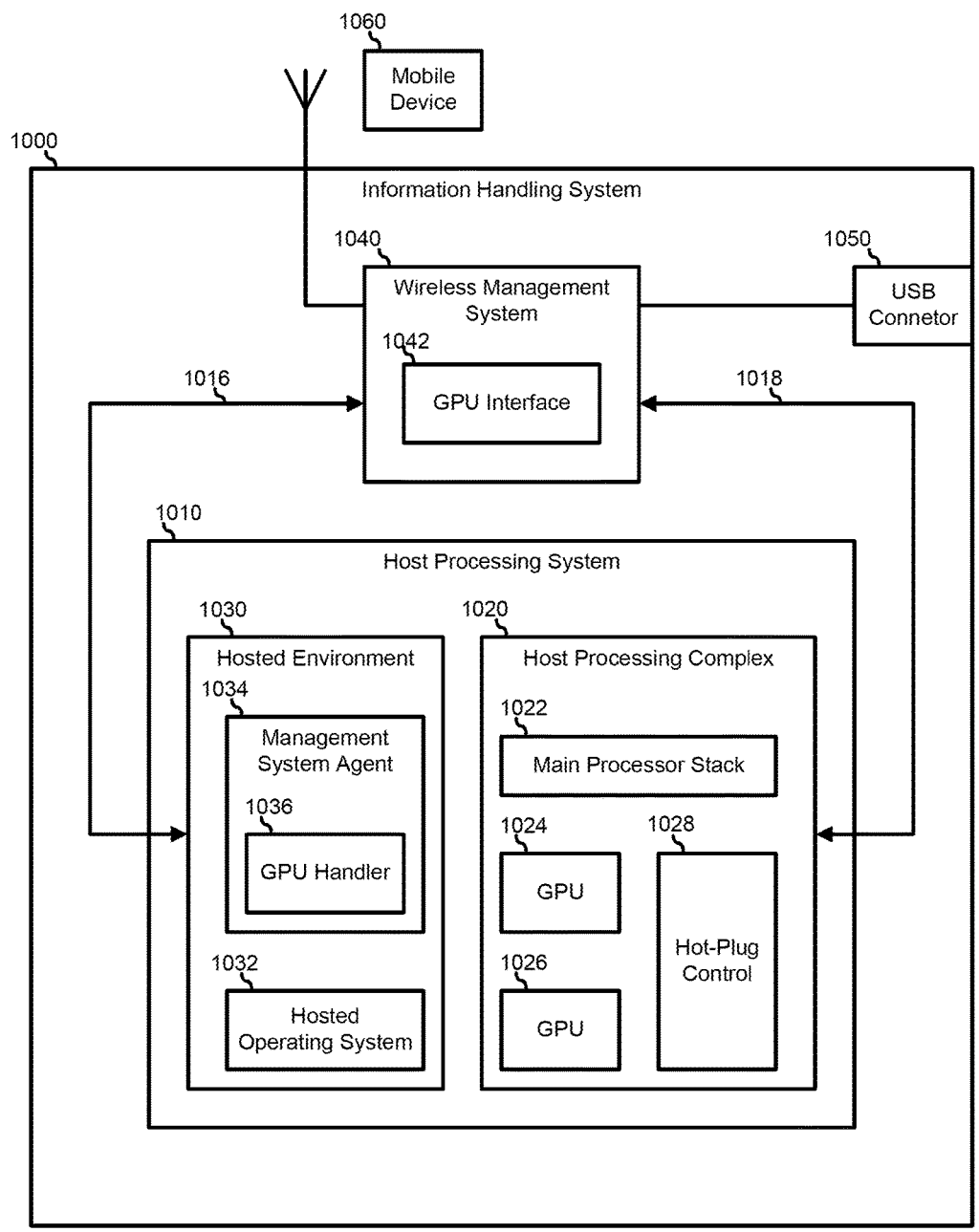
FIG. 10 is a block diagram of an information handling system according to an embodiment of the present disclosure.

FIG. 10 illustrates an information handling system 1000 including a host processing system 1010, a wireless management system 1040, and a USB connector 1050. Host processing system 1010 includes a host processing complex 1020 and a hosted environment 1030. Host processing complex 1020 represents the main processing elements of information handling system 1000, including a main processor stack 1022 including one or more processors, chipset elements, storage devices, memory devices, I/O devices, and the like, general-purpose processing units (GPUs) 1024 and 1026, and a hot-plug control module 1028. GPUs 1024 and 1026 represent processing resources of host processing complex 1020 that can be utilized to offload main processor stack 1022 from various functions as needed or desired. An example of GPUs 1024 and 1026 include graphics co-processors, encoding co-processors, or media co-processors, and the like, such as various processing devices as my be supplied by different vendors or manufacturers. In a particular embodiment, GPUs 1024 and 1026 represent a particular architecture that utilizes graphics co-processors to offload various compute intensive tasks and services from main processor stack 1022. Hot-plug control module 1028 operates to receive an indication that one or more of GPUs 1024 and 1026 are desired to be replaced in information handling system 1000 without the complete powering down of the information handling system, to remove operating power from the selected GPU, and, upon receiving an indication from a service technician that the selected GPU has been replaced, to supply the operating power to the replacement GPU and to reboot the replacement GPU. For example, hot-plug control module 028 can issue a secondary bus reset (SBR) to the replacement GPU to reset the GPU without powering down information handling system 1000.

Hosted environment 1030 represents a processing environment instantiated on host processing complex 1020, and can include a BIOS or UEFI for information handling system 1000, other firmware, device drivers, and the like, that establish the core operating code for establishing the hosted environment, and to launch a hosted OS 1032 on the host processing complex. Hosted OS 1032 operates to manage the runtime aspects of hosted environment 1030, to launch programs and applications on host processing complex 1020, and to launch, manage, maintain, and halt workloads on GPUs 1024 and 1026. For example, after a hot-plug event, a replacement GPU can be reset by hot-plug control module 1028, and hosted OS can detect the presence of the replacement GPU, and launch a workload on the replacement GPU. Hosted environment 1030 also includes a management system agent 1034, the operation of which is described further, below.

Wireless management system 1040 is similar to management system 200, and includes a GPU interface 1042. Wireless management controller 1040 is connected to interact with various functions and features of hosted environment 1030 via a keyboard controller style (KCS) interface/USB-NIC interface 1016, and to interact with various functions and features of host processing complex 1020 via one or more out-of-band interface 1018. In particular, wireless management system 1040 interacts with the various functions and features of hosted environment 1030 via a management system agent 1034 that is instantiated in the hosted environment to permit a user connected to the wireless management system to obtain status information from the pre-boot and runtime elements of the hosted environment, including the programs and applications instantiated in the hosted environment, and the workloads instantiated on GPUs 1024 and 1026. The user can also provide commands and otherwise control the operations of the programs, applications, and workloads, including directing hosted OS 1032 to launch a program, application, or workload, to modify the runtime operation of a program, application, or workload, and to halt the execution of a program, application, or workload, as needed or desired.

Wireless management system 1040 includes a GPU interface module 1042 that interacts with the various functions and features of hosted environment 1030 via a GPU handler module 1036 of management system agent 1034 to permit the user to obtain status information from the workloads instantiated on GPUs 1024 and 1026. The user can also provide commands and otherwise control the operations of workloads, including directing hosted OS 1032 to launch a workload, to modify the runtime operation of a workload, and to halt the execution of a workload, as needed or desired.

Wireless management system 1040 also interacts out-of-band with the various functions and features of host processing complex 1020, and particularly of main processing stack 1022. For example, wireless management system 1040 can receive status information from main processor stack 1022, such as processor loading information, I/O bandwidth utilization information, memory capacity and utilization information, and the like. Wireless management system 1040 also provides commands and otherwise controls the operations of the elements of information handling system 1000, such as by changing an operating voltage or an operating frequency of main processor stack 1022.

GPU interface module 1042 further interacts out-of-band with the various functions and features of host processing complex 1020, and particularly with GPUs 1024 and 1026 and with hot-plug control module 1028. For example, GPU interface module 1042 can receive status information from GPUs 1024 and 1026, such as GPU loading information, GPU I/O bandwidth utilization information, GPU memory capacity and utilization information, and the like. GPU interface module 1042 also provides commands and otherwise controls the operations of GPUs 1024 and 1026, such as by changing an operating voltage or an operating frequency of one or more of the GPUs. In addition, GPU interface module 1042 operates to direct hot-plug control module 1028 to provide hot-plug operations on one or more of GPUs 1024 and 1026, as described above.

GPU interface module 1042 provides a management interface that permits a user that is connected to wireless management system 1040 to select one or more of GPUs 1024 and 1026, and to view the current operating status of the selected GPU, such as by identifying the workload currently being run on the selected GPU, presenting the current processing load condition, I/O bandwidth, memory usage, or the like, or by otherwise displaying information related to the status of the selected GPU. Here, GPU interface module 1042 directs GPU handler module 1036 to retrieve the requested information from hosted environment 1030, from hosted OS 1032, or directly from the selected one of GPUs 1024 and 1026, and to provide the retrieved information to the GPU interface module.

The management interface further permits the user to initiate a hot-plug event for the selected GPU. Here, GPU interface module 1042 directs GPU handler module 1036 to request hosted OS 1032 to halt the workload running on the selected GPU, and, when the workload is successfully halted, the GPU handler module provides an indication to the GPU interface module that the workload was successfully halted. GPU interface module 1042 then directs hot-plug control module 1028 to initiate a hot-plug event on the selected GPU, and when the replacement GPU is successfully rebooted, the hot-plug control module provides an indication to the GPU interface module that the replacement GPU was successfully rebooted.

Further, the management interface permits the user to select a workload to be launched on the replacement GPU, and to direct hosted OS 1032 to launch the selected workload on the replacement GPU. Here, GPU interface module 1042 directs GPU handler module 1036 to query hosted OS 1032 for the available workloads, and the GPU handler module returns the list of available workloads to the GPU interface module. The management interface presents the list of available workloads to the connected device, and the user selects the workload to launch from the list. GPU interface module 1042 then directs GPU handler module 1036 to request hosted OS 1032 to launch the selected workload on the selected GPU, and when the workload is successfully launched, the GPU handler module provides an indication to the GPU interface module that the selected workload was successfully launched on the selected GPU. The management interface then provides an indication to the user that the selected workload was successfully launched on the selected GPU.

In this way, a user can connect a user device to wireless management module 1040 to gain access to the functions and features of the management interface. The user device can be connected to wireless management module by plugging a device into USB connector 1050, or by establishing a wireless connection with mobile device 1060. In a particular case, one or more element of information handling system 1000, such as host processing system 1010 or wireless management system 1040 can detect that one of GPUs 1024 or 1026 is failing, and provide an alert to a service technician. The service technician can bring mobile device 1060 to information handling system 1000 and connect wirelessly to wireless management system 1040 to access the management interface. The service technician can then initiate a hot-plug event and replace the failing GPU. Then the service technician can direct hosted OS 1032 to relaunch a workload on the replacement GPU. By utilizing mobile device 1060, the service technician is freed from having to haul a crash cart to information handling system 1000 to perform the hot-swap of the failing GPU.

An example of a management interface includes a command line interface, a graphical user interface, another type of command and control interface, or the like, as needed or desired. In a particular embodiment, the management interface resides on the connected device.

Figure 11:
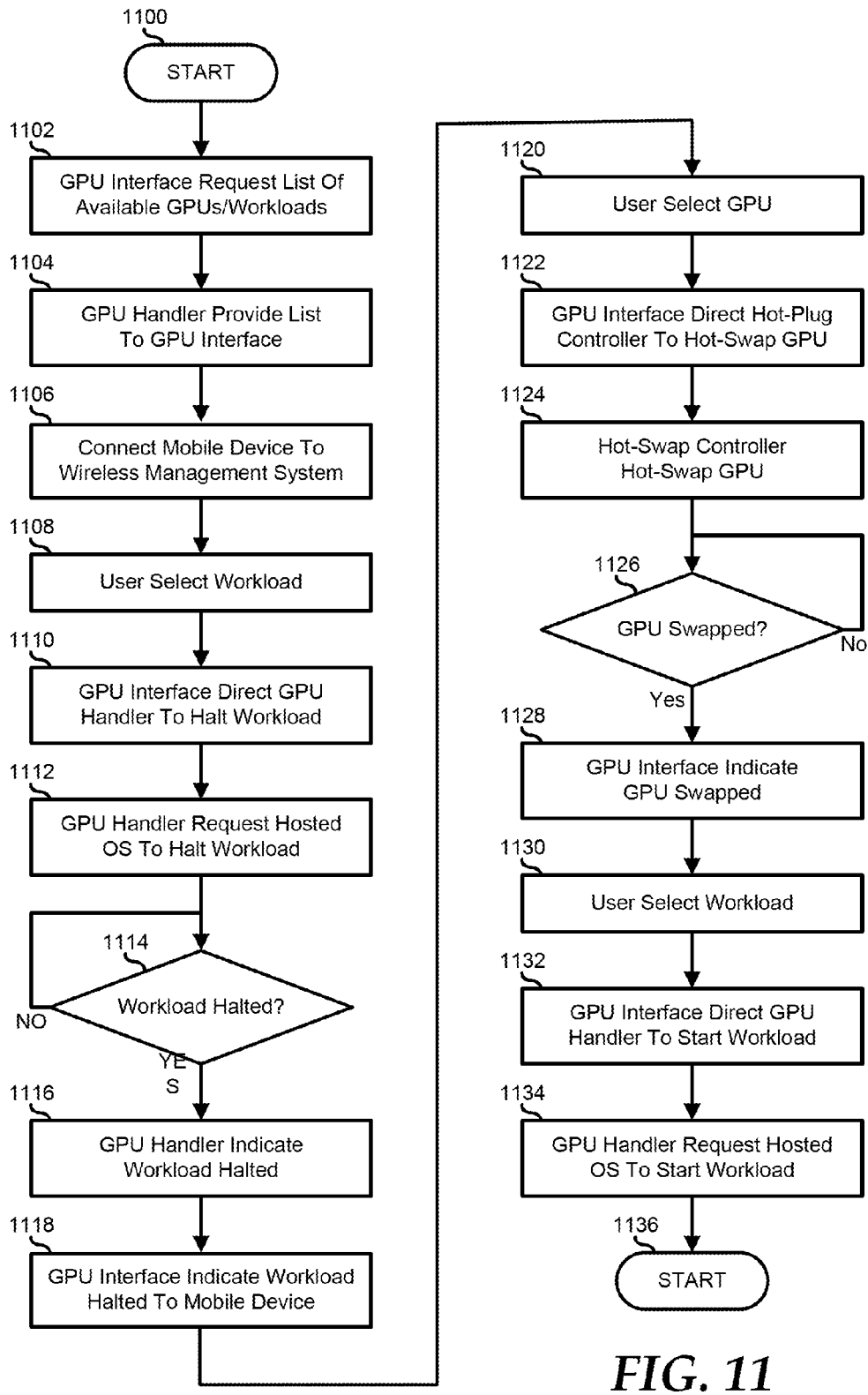
FIG. 11 is a flowchart illustrating a method for managing workloads and hot-swapping a general-purpose processing units of an information handling system of a data center according to an embodiment of the present disclosure.

FIG. 11 illustrates a method for managing workloads and hot-swapping a general-purpose processing unit of an information handling system in a data center starting at block 1100. GPU interface module 1042 requests a list of available GPUs of an information handling system and the workloads that can be distributed to the GPUs from GPU interface module 1036 in block 1102. Here, GPU handler module 1036 request and receives the list of available GPUs and workloads from hosted OS 1032. GPU handler module 1036 provides the list of available GPUs and workloads to GPU interface module 1042 in block 1104. Mobile device 1060 is wirelessly connected to wireless management system 1040 and GPU interface module 1042 provides the list of available GPUs and workloads to the mobile device in block 1106. A user of mobile device 1060 selects a workload from the list of available workloads in block 1108. GPU interface module 1042 directs GPU handler module 1036 to halt the selected workload in block 1110.

GPU handler module 1036 requests hosted OS 1032 to halt the selected workload in block 1112, and a decision is made as to whether or not the workload was halted in decision block 1114. When the halting of the workload is not completed, the "NO" branch of decision block 1114 is taken and the method loops back to decision block 1114 until the halting of the workload is completed. When the halting of the workload is completed, the "YES" branch of decision block 1114 is taken and GPU handler module 1036 provides an indication to GPU interface module 1042 that the selected workload was halted in block 1116, and the GPU interface module forwards the indication to mobile device 1060 in block 1118. The user of mobile device 1060 selects a GPU from the list of available GPUs in block 1120. GPU interface module 1042 directs hot-swap control module 1028 to hot-swap the selected GPU in block 1122.

Hot-swap control module 1028 conducts the hot-swap of the selected GPU in block 1124, and a decision is made as to whether or not the GPU was swapped in decision block 1126. When the swapping of the GPU is not completed, the "NO" branch of decision block 1126 is taken and the method loops back to decision block 1126 until the swapping of the GPU is completed. When the swapping of the GPU is completed, the "YES" branch of decision block 1126 is taken and GPU interface module 1042 provides an indication to mobile device 1060 that the selected GPU was swapped in block 1128. The user of mobile device 1060 selects a workload to launch from the list of available workloads in block 1130. GPU interface module 1042 directs GPU handler module 1036 to launch the selected workload in block 1132, the GPU handler module requests hosted OS 1032 to launch the selected workload in block 1134, and the method ends in block 1136.

Figure 8:
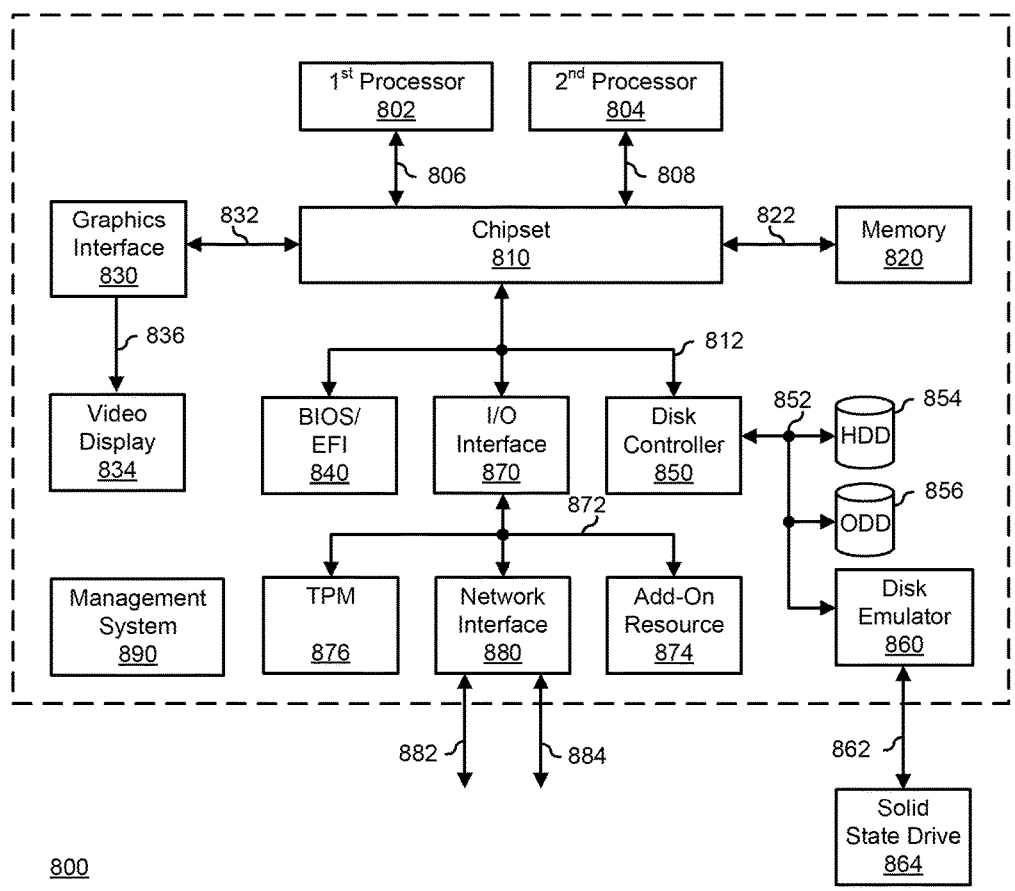
FIG. 8 is a block diagram illustrating a generalized information handling system according to an embodiment of the present disclosure.
Figure 9:
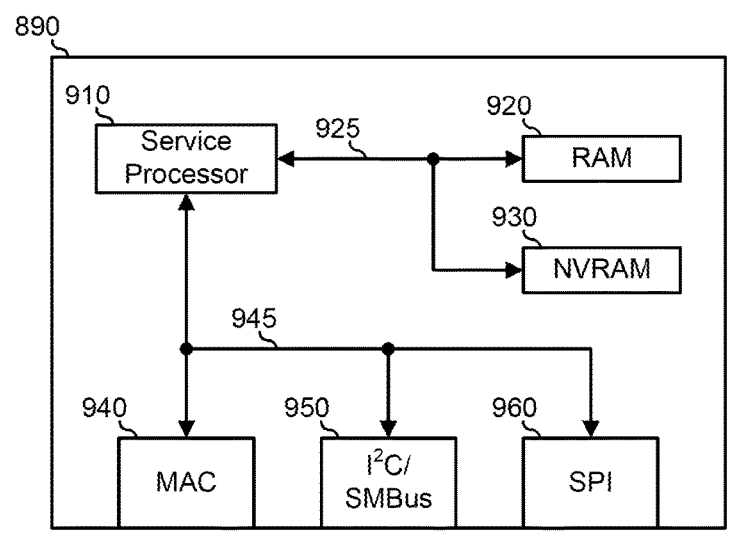
FIG. 9 is a block diagram illustrating an embodiment of a management system of the information handling system of FIG. 8.

FIG. 8 illustrates a generalized embodiment of information handling system 800. For purpose of this disclosure information handling system 800 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 800 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 800 can include processing resources for executing machine-executable code, such as a central processing unit (CPU), a programmable logic array (PLA), an embedded device such as a System-on-a-Chip (SoC), or other control logic hardware. Information handling system 800 can also include one or more computer-readable medium for storing machine-executable code, such as software or data. Additional components of information handling system 800 can include one or more storage devices that can store machine-executable code, one or more communications ports for communicating with external devices, and various input and output (I/O) devices, such as a keyboard, a mouse, and a video display. Information handling system 800 can also include one or more buses operable to transmit information between the various hardware components.

Information handling system 800 can include devices or modules that embody one or more of the devices or modules described above, and operates to perform one or more of the methods described above. Information handling system 800 includes a processors 802 and 804, a chipset 810, a memory 820, a graphics interface 830, include a basic input and output system/extensible firmware interface (BIOS/EFI) module 840, a disk controller 850, a disk emulator 860, an input/output (I/O) interface 870, a network interface 880, and a management system 890. Processor 802 is connected to chipset 810 via processor interface 806, and processor 804 is connected to the chipset via processor interface 808. Memory 820 is connected to chipset 810 via a memory bus 822. Graphics interface 830 is connected to chipset 810 via a graphics interface 832, and provides a video display output 836 to a video display 834. In a particular embodiment, information handling system 800 includes separate memories that are dedicated to each of processors 802 and 804 via separate memory interfaces. An example of memory 820 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 840, disk controller 850, and I/O interface 870 are connected to chipset 810 via an I/O channel 812. An example of I/O channel 812 includes a Peripheral Component Interconnect (PCI) interface, a PCI-Extended (PCI-X) interface, a high speed PCI-Express (PCIe) interface, another industry standard or proprietary communication interface, or a combination thereof. Chipset 810 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/EFI module 840 includes BIOS/EFI code operable to detect resources within information handling system 800, to provide drivers for the resources, initialize the resources, and access the resources. BIOS/EFI module 840 includes code that operates to detect resources within information handling system 800, to provide drivers for the resources, to initialize the resources, and to access the resources.

Disk controller 850 includes a disk interface 852 that connects the disc controller to a hard disk drive (HDD) 854, to an optical disk drive (ODD) 856, and to disk emulator 860. An example of disk interface 852 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 860 permits a solid-state drive 864 to be connected to information handling system 800 via an external interface 862. An example of external interface 862 includes a USB interface, an IEEE 1394 (Firewire) interface, a proprietary interface, or a combination thereof. Alternatively, solid-state drive 864 can be disposed within information handling system 800.

I/O interface 870 includes a peripheral interface 872 that connects the I/O interface to an add-on resource 874, to a TPM 876, and to network interface 880. Peripheral interface 872 can be the same type of interface as I/O channel 812, or can be a different type of interface. As such, I/O interface 870 extends the capacity of I/O channel 812 when peripheral interface 872 and the I/O channel are of the same type, and the I/O interface translates information from a format suitable to the I/O channel to a format suitable to the peripheral channel 872 when they are of a different type. Add-on resource 874 can include a data storage system, an additional graphics interface, a network interface card (NIC), a sound/video processing card, another add-on resource, or a combination thereof. Add-on resource 874 can be on a main circuit board, on separate circuit board or add-in card disposed within information handling system 800, a device that is external to the information handling system, or a combination thereof.

Network interface 880 represents a NIC disposed within information handling system 800, on a main circuit board of the information handling system, integrated onto another component such as chipset 810, in another suitable location, or a combination thereof. Network interface device 880 includes network channels 882 and 884 that provide interfaces to devices that are external to information handling system 800. In a particular embodiment, network channels 882 and 884 are of a different type than peripheral channel 872 and network interface 880 translates information from a format suitable to the peripheral channel to a format suitable to external devices. An example of network channels 882 and 884 includes InfiniBand channels, Fibre Channel channels, Gigabit Ethernet channels, proprietary channel architectures, or a combination thereof. Network channels 882 and 884 can be connected to external network resources (not illustrated). The network resource can include another information handling system, a data storage system, another network, a grid management system, another suitable resource, or a combination thereof.

Management controller 890 provides for out-of-band monitoring, management, and control of the respective elements of information handling system 800, such as cooling fan speed control, power supply management, hot-swap and hot-plug management, firmware management and update management for system BIOS or UEFI, Option ROM, device firmware, and the like, or other system management and control functions as needed or desired. As such, management system 890 provides some or all of the functions and features of the management systems described herein.

The preceding description in combination with the Figures is provided to assist in understanding the teachings disclosed herein. The preceding discussion focused on specific implementations and embodiments of the teachings. This focus has been provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
a host processing complex to instantiate a hosted processing environment and including a first general-purpose processing unit (GPU) and a GPU hot-plug module that enables a hot-plug operation to replace the first GPU with a second GPU while power is provided to the host processing complex, wherein the hosted processing environment includes a plurality of workloads that can be instantiated on the first GPU, the plurality of workloads including a first workload and a second workload, and wherein the hosted processing environment instantiates the first workload on the first GPU; and
a wireless management system that operates out of band from the hosted processing environment, that directs the hosted processing environment to halt the first workload, and that directs the GPU hot-plug module to perform the hot-plug operation, and directs the hosted processing environment to launch the second workload on the second GPU after the GPU hot-plug module performs the hot-plug operation;
wherein the hosted processing environment provides a list of the workloads to the wireless management system.

2. The information handling system of claim 1, wherein the wireless management system further couples to a mobile device, provides the list to the mobile device, and receives a selection of the second workload from the mobile device, and wherein directing the hosted processing environment to launch the second workload is in response to receiving the selection.

3. The information handling system of claim 1, wherein the host processing complex includes a plurality of GPUs including the first GPU.

4. The information handling system of claim 3, wherein the hosted processing environment provides a list of the plurality of GPUs to the wireless management system.

5. The information handling system of claim 4, wherein the wireless management system further couples to a mobile device, provides the list to the mobile device, and receives a selection of the first GPU from the mobile device, and wherein directing the GPU hot-plug module to perform the hot-plug operation is in response to receiving the selection.

6. A method, comprising:
instantiating, on a host processing complex of an information handling system, a hosted processing environment;
instantiating, by the hosted processing environment, a first workload on a first general-purpose processing unit (GPU) of the host processing complex, wherein the hosted processing environment includes a plurality of workloads that can be instantiated on the first GPU, the plurality of workloads including a first workload and a second workload;
operating a wireless management system of the information handling system out of band from the hosted processing environment;
directing, by the wireless management system, the hosted processing environment to halt the first workload;
directing a GPU hot-plug module to perform a hot-plug operation to replace the first GPU with a second GPU while power is provided to the host processing complex; and
directing, by the management system, the hosted processing environment to launch a second workload on the second GPU after the GPU hot-plug module performs the hot-plug operation.

7. The method of claim 6, further comprising:
providing, by the hosted processing environment, a list of the plurality of workloads to the wireless management system.

8. The method of claim 7, further comprising:
coupling the wireless management system to a mobile device;
providing, by the wireless management system, the list to the mobile device; and
receiving, by the wireless management system a selection of the second workload from the mobile device, wherein directing the hosted processing environment to launch the second workload is in response to receiving the selection.

9. The method of claim 6, wherein the host processing complex includes a plurality of GPUs including the first GPU.

10. The method of claim 9, further comprising:
providing, by the hosted processing environment, a list of the plurality of GPUs to the wireless management system.

11. The method of claim 10, further comprising:
coupling the wireless management system to a mobile device;
providing, by the wireless management system, the list to the mobile device; and
receiving, by the wireless management system, a selection of the first GPU from the mobile device, wherein directing the GPU hot-plug module to perform the hot-plug operation is in response to receiving the selection.

12. A non-transitory computer-readable medium including code for performing a method, the method comprising:
instantiating, on a host processing complex of an information handling system, a hosted processing environment;
instantiating, by the hosted processing environment, a first workload on a first general-purpose processing unit (GPU) of the host processing complex, wherein the hosted processing environment includes a plurality of workloads that can be instantiated on the first GPU, the plurality of workloads including a first workload and a second workload;
operating a wireless management system of the information handling system out of band from the hosted processing environment;
directing, by the wireless management system, the hosted processing environment to halt the first workload;
directing a GPU hot-plug module to perform a hot-plug operation to replace the first GPU with a second GPU while power is provided to the host processing complex; and
directing the hosted processing environment to launch a second workload on the second GPU after the GPU hot-plug module performs the hot-plug operation.

13. The computer-readable medium of claim 12, further comprising:
providing, by the hosted processing environment, a list of the plurality of workloads to the wireless management system.

14. The computer-readable medium of claim 13, wherein the host processing complex includes a plurality of GPUs including the first GPU, the method further comprising:
providing, by the hosted processing environment, a list of the plurality of GPUs to the wireless management system.

* * * * *